Nov. 28, 1950     A. J. MARCOUILLER     2,531,856
COLLAPSIBLE CART

Filed July 15, 1949     2 Sheets-Sheet 1

Inventor
Arthur J. Marcouiller

By Clarence A. O'Brien
and Harvey B. Jacobson
Attorneys

Nov. 28, 1950  A. J. MARCOUILLER  2,531,856
COLLAPSIBLE CART
Filed July 15, 1949  2 Sheets-Sheet 2
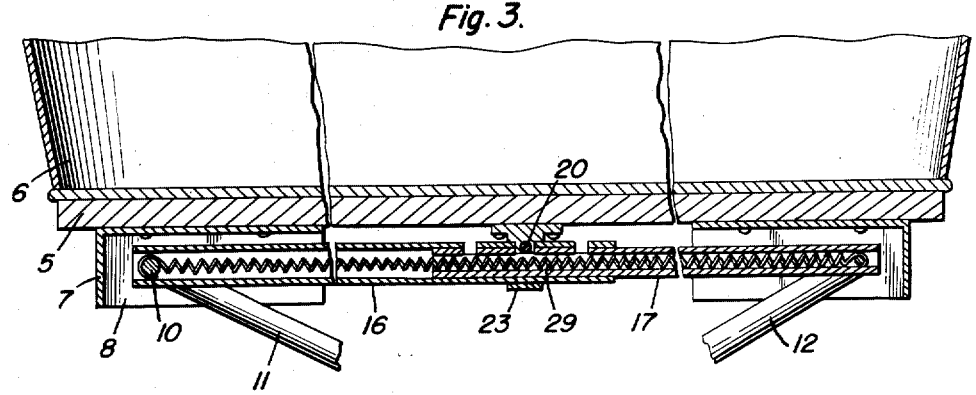
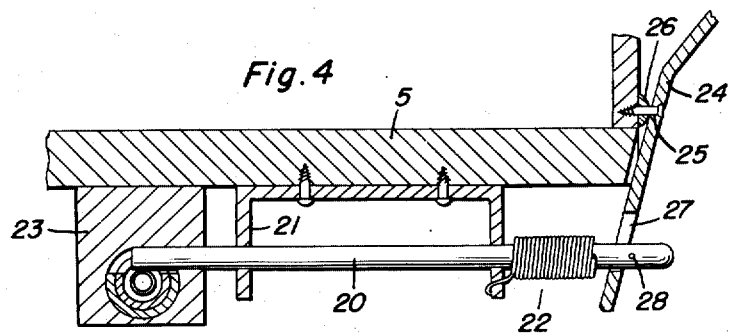
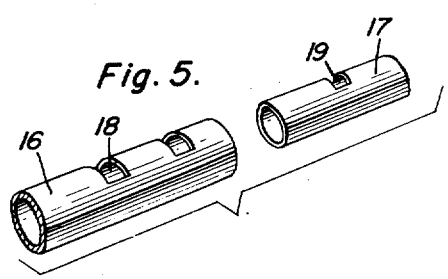
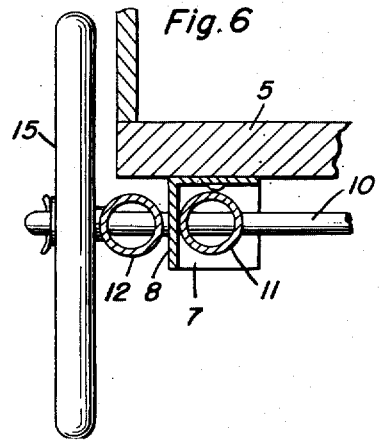
Inventor
Arthur J. Marcouiller Patented Nov. 28, 1950

2,531,856

UNITED STATES PATENT OFFICE 2,531,856

COLLAPSIBLE CART

Arthur J. Marcouiller, Milwaukee, Wis.

Application July 15, 1949, Serial No. 104,863

2 Claims. (Cl. 280—41)

The present invention relates to new and useful improvements in collapsible carts for use with laundry baskets and similar household receptacles.

An important object of the invention is to provide collapsible legs or supports for the wheels of the cart whereby the basket may be raised or lowered to support the basket at the desired elevated position.

A further object of the invention is to provide collapsible legs or supports for the wheels of the cart with spring means for swinging the legs or supports in one direction to raise the basket and subjecting the legs or supports to the weight of the basket to lower the same.

A still further object is to provide a novel locking device for holding the legs or supports in a desired adjusted position.

A still further object is to provide a device of this character of simple and practical construction, which is efficient and reliable in operation, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 3 is a longitudinal sectional view taken on the line 3—3 of Figure 2;

Figure 4 is an enlarged fragmentary sectional view taken on the line 4—4 of Figure 2;

Figure 5 is a group perspective view of the telescoping locking tubes;

Figure 6 is an enlarged fragmentary sectional view taken on the line 6—6 of Figure 2; and Figure 7 is an enlarged fragmentary perspective view of the pivot or fulcrum button for the locking handle.

Figure 1:
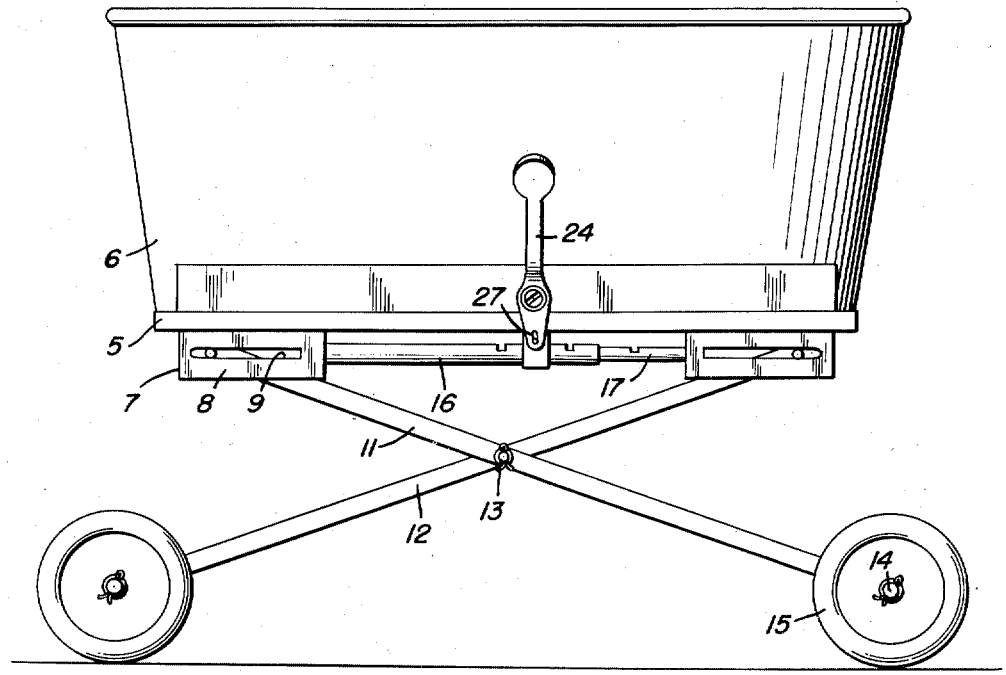
Figure 1 is a side elevational view.
Figure 2:
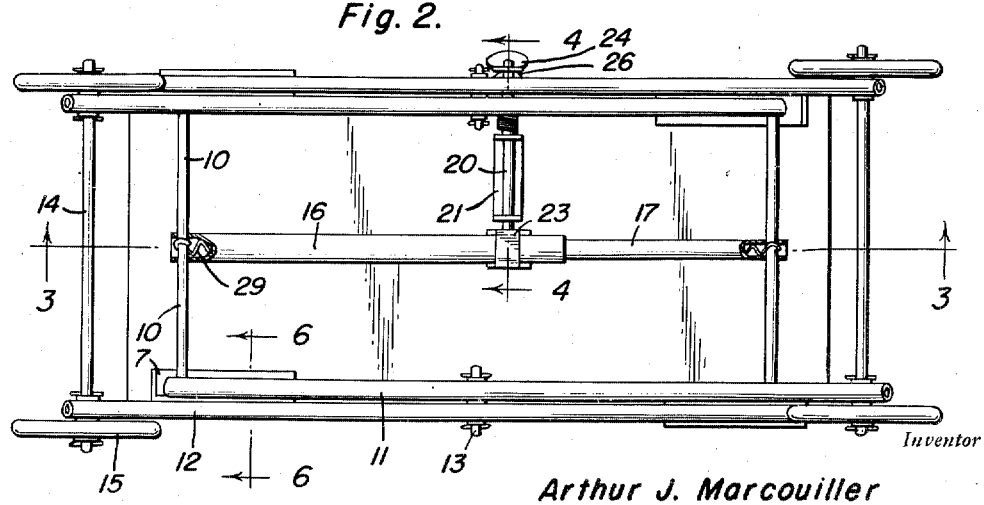
Figure 2 is a bottom plan view.

Referring now to the drawings in detail wherein, for the purpose of illustration, I have disclosed a preferred embodiment of the invention, the numeral 5 designates a platform to which the bottom of a laundry basket or other receptacle indicated at 6 is suitably secured. Brackets 7 of angle iron construction are suitably secured to the under side of platform 5 adjacent each corner thereof to form a pair at each end of the platform 5, each bracket including a downwardly extending flange 8 formed with a longitudinal slot 9.

A cross rod 10 is slidably positioned in the slots 9 of each pair of brackets 7 to which pairs of legs or supports 11 and 12 are suitably secured at their upper ends. The legs 11 and 12 at each side of the platform are pivotally connected to each other at their intermediate portions by pins 13 for vertical raising and lowering movement of the lower ends of the legs or supports. Axles or rods 14 connect the lower ends of the legs of each pair to each other for uniform raising and lowering movement and wheels 15 are journaled on the outer ends of the axles 14.

The cross rods 10 at the upper ends of the pairs of legs or supports 11 and 12 extend transversely through one end of a pair of tubes 16 and 17 having their other ends telescoping one within the other. The upper portions of tubes 16 and 17 are formed with registering notches 18 and 19, respectively, for receiving a locking bolt 20 slidably supported in a horizontal position in an inverted U-shaped bracket 21 secured to the under side of platform 5 at a point substantially mid-way of the ends of the platform. A coil spring 22 connects the bolt 20 to the bracket 21 to hold the bolt in locking engagement with a pair of the aligned notches 18 and 19.

The inner end portions of tubes 16 and 17 are slidably supported in a block 23 suitably secured to the under side of the platform 5 and in which the inner end of bolt 20 is also slidably supported, the block 23 rigidly supporting tubes 16 and 17 to insure accurate alignment of notches 18 and 19.

The bolt 20 is retracted to release tubes 16 and 17 by means of a handle 24 rockably supported at its intermediate portion on a pin 25 projecting from one side of platform 5 and with a substantially dome shaped button or spacer 26 positioned between the handle and the platform to form a fulcrum against which the handle rocks. The lower end of handle 24 is formed with a vertical slot 27 through which the outer end of bolt 20 projects and is held in the slot 27 by a transverse pin 28.

A coil spring 29 extends longitudinally through tubes 16 and 17 with the ends of the spring connected to the pair of cross bars 10 for the pairs of supports or legs 11 and 12.

In the operation of the device, locking bolt 20 is normally held inwardly by spring 22 to hold the bolt engaged in a pair of the aligned notches 18 and 19 of extensible tubes 16 and 17 to hold legs 11 and 12 in either a raised position closely under platform 5 or in a lowered position to support the platform and basket elevated.

The bolt 20 is retracted by pressing handle 24 inwardly to rock the handle on button 26.

When bolt 20 is retracted, the weight of the basket will fold or collapse legs 11 and 12 against the under side of platform 5 and by lifting the basket upwardly and relieving the legs of the weight thereof, while the bolt is retracted, spring 29 will pull rods 10 toward each other to lower the legs.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. A collapsible cart comprising a body portion, a pair of legs at each end of the body and at opposite sides thereof, the legs at each side of the body being pivotally connected to each other at their intermediate portions and having wheels at their lower ends, transverse rods connecting the upper ends of each pair of legs to each other for uniform raising movement to raise said body, means slidably supporting the rods at the under side of the body, spring means connected to the rods for sliding the same to raise the legs, a contractile hollow member connected to the rods and housing said spring means, and means for locking the contractile member in different contracted positions to hold the legs raised into different positions for correspondingly raising said body.

2. A collapsible cart comprising a body portion, a pair of legs at each end of the body and at opposite sides thereof, the legs at each side of the body being pivotally connected to each other at their intermediate portions and having wheels at their lower ends, transverse rods connecting the upper ends of each pair of legs to each other for uniform raising movement to raise the body, means slidably supporting the rods at the under side of the body, spring means connected to the rods for sliding the same to raise the legs, a contractile hollow member connected to the rods and housing the spring means and comprising telescopic sections having registering openings, and a locking bolt selectively engaged in said openings to lock the contractile member in different contracted positions and hold the legs in different raised positions for correspondingly raising said body.

ARTHUR J. MARCOUILLER.

REFERENCES CITED

The following references are of record in the file of this patent:

UNITED STATES PATENTS

| Number | Name | Date |
|---|---|---|
| 1,121,744 | McLaughlin | Dec. 22, 1914 |
| 1,744,718 | Baumgartner | Jan. 28, 1930 |
| 2,492,676 | Zajicek | Dec. 27, 1949 |